United States Patent

Michalski et al.

[11] Patent Number: 6,122,602
[45] Date of Patent: Sep. 19, 2000

[54] METHOD AND ARRANGEMENT FOR ELECTROMAGNETIC WAVE DISTANCE MEASUREMENT BY THE PULSE TRANSIT TIME METHOD

[75] Inventors: Bernhard Michalski, Maulburg, Germany; Kenneth L. Perdue, Franklin, Ind.

[73] Assignee: Endress + Hauser GmbH + Co., Marlburg, Germany

[21] Appl. No.: 09/059,542

[22] Filed: Apr. 13, 1998

Related U.S. Application Data

[60] Provisional application No. 60/045,463, May 2, 1997.

[51] Int. Cl.$^7$ ...................................................... G01S 15/08
[52] U.S. Cl. ............................. 702/159; 702/79; 367/99; 367/122; 342/118; 356/5.01
[58] Field of Search ............................... 702/79, 159, 57, 702/66, 69–74, 78, 80, 124–126, 143, 176, 189, FOR 109, FOR 110, FOR 146, FOR 154, 55, 166; 367/122, 99, 118, 127, 128; 342/107, 109, 118, 131–135, 172, 386, 387, 126, 128, 136; 324/76.15, 76.24, 76.14, 76.54, 76.58; 341/122–125, 173, 176; 356/5.01, 5.05, 5.1

[56] References Cited

U.S. PATENT DOCUMENTS

| | | | |
|---|---|---|---|
| 5,323,361 | 6/1994 | Elle et al. | 367/98 |
| 5,510,800 | 4/1996 | McEwan. | |
| 5,594,436 | 1/1997 | Hassner et al. | 341/59 |
| 5,767,409 | 6/1998 | Yamaguchi | 73/602 |
| 5,774,091 | 6/1998 | McEwan | 342/387 |
| 5,822,275 | 10/1998 | Michalski | 367/99 |
| 5,827,943 | 10/1998 | Schmidt | 73/1.73 |

FOREIGN PATENT DOCUMENTS

| | | |
|---|---|---|
| 8-194062 | 7/1996 | Japan. |
| 96/19737 | 6/1996 | WIPO. |

*Primary Examiner*—Hal Wachsman
*Attorney, Agent, or Firm*—Bose McKinney & EvansLLP

[57] ABSTRACT

For electromagnetic wave distance measurement by the pulse transit time method, short electromagnetic transmission pulses are emitted at periodic transmission instants. The signals received in selected transmission cycles after the respective transmission instants are sampled for obtaining in each of these transmission cycles a sample at a sampling instant in a respective sampling time interval, each sampling instant having a delay dictated by a sampling function relative to the respective transmission instant. The sampling instants exhibit differing delays relative to the respective transmission instant so that the samples in sequence produce an image of the sampled received signal extended in time. The sampling function dictating the delays is generated by a computing circuit, preferably a microcomputer, thus making it possible to make use of any sampling function and to modify sampling of the received signals in any way. More particularly, it is possible to measure the applied delays and to correct them to maintain predetermined design values. One sampling function which can be put to use to advantage in this method is a staircase function, each step of which has the length of several sampling time intervals.

18 Claims, 2 Drawing Sheets

METHOD AND ARRANGEMENT FOR ELECTROMAGNETIC WAVE DISTANCE MEASUREMENT BY THE PULSE TRANSIT TIME METHOD

This application claims the benefit of U.S. Provisional Application No. 60/045,463, filed May 2, 1997.

BACKGROUND OF THE INVENTION

1. Field of the Invention

The invention relates to electromagnetic pulse distance measurement by the pulse transit time method wherein short electromagnetic transmission pulses are emitted at periodic transmission instants, the wanted echo pulse reflected by the object is established from the signals received in each transmission cycle after the transmission instant, and the transit time of the wanted echo pulse is determined as a measure of the distance to be measured.

2. Description of the Prior Art

From PCT publications WO 96/07928 and WO 96/19737 it is known particularly for measuring very short distances to strobe sample the signals received after the transmission instants in a sequence of transmission cycles whereby a sample is obtained in each transmission cycle at a sampling instant determined by a ramp function, the sampling instants exhibiting relative to the transmission instants in consecutive transmission cycles an increasing delay dictated by the linear increase of the ramp function. The samples obtained in sequence result in an image of the sampled received signal extended in time. In these known methods the ramp function is defined by a sawtooth signal generated by a ramp generator so that it is determined by the configuration of the ramp generator. There is thus no possibility of changing it as a function of the measurement result for adapting to differing conditions of application or for correcting deviations. It is likewise not possible to make use of some other sampling function instead of a ramp function.

SUMMARY OF THE INVENTION

One object of the invention is to provide a method of the aforementioned kind with which any sampling function can be made use of and which permits any desired modification of the sampling function to be used.

A further object of the invention is to provide a method of this kind which provides higher sensitivity, improved resolution, a reduced power requirement and a better suppression of unwanted effects.

Yet a further object of the invention is to provide an arrangement with which the method in accordance with the invention can be implemented.

In accordance with one aspect the invention provides a method for electromagnetic wave distance measurement by the pulse transit time method, wherein short electromagnetic transmission pulses are emitted at periodic transmission instants and the signals received in selected transmission cycles after the respective transmission instants are sampled for obtaining in each of these transmission cycles a sample at a sampling instant in a respective sampling time interval, each sampling instant having a delay dictated by a sampling function relative to the respective transmission instant so that the sampling instants exhibit differing delays relative to the respective transmission instants, and wherein the sampling function dictating the delays is generated by a computing circuit.

Due to the sampling function being generated by a computing circuit, for example by a microcomputer it is possible to make use of any desired sampling function and thus to vary sampling of the received signals in any way desired. Sampling can also be varied as a function of the measurement result, for example to increase the number of samplings in the domains of interest and to reduce the number in other domains. It is furthermore possible to control the delays, actually achieved, precisely in accordance with prescribed design values.

In accordance with still a further aspect the invention provides a method for electromagnetic wave distance measurement by the pulse transit time method, wherein short electromagnetic transmission pulses are emitted at periodic transmission instants and the signals received in selected transmission cycles after the respective transmission instants are sampled for obtaining in each of these transmission cycles a sample at a sampling instant in a respective sampling time interval, each sampling instant having a delay dictated by a sampling function relative to the respective transmission instant so that the sampling instants exhibit differing delays relative to the respective transmission instants, and wherein said sampling function dictating said delays is a staircase function the steps of which have a length of a plurality of sampling time intervals so that said sampling instants in a plurality of consecutive sampling time intervals have the same delay relative to the respective transmission instants.

Due to this method repeated sampling of the received signal occurs at specific sampling instants corresponding to the same measured distance. This permits integration of several samples in sequence, as a result of which a greater real-time signal amplitude is achieved. Furthermore, a higher sensitivity is achieved and the influence of unwanted effects is reduced.

An arrangement for electromagnetic wave distance measurement by the pulse transit time method in accordance with the invention comprises a transceiver assembly for emitting short electromagnetic transmission pulses at periodic transmission instants and for furnishing received signals containing the reflected echo pulses, a transmission pulse generator for generating said transmission pulses, a transmission clock generating a periodic transmission clock signal supplied to said transmission pulse generator and dictating said transmission instants, a sampling circuit in which said received signals are sampled in consecutive transmission cycles with control by sampling pulses, a sampling pulse generator generating one sampling pulse at a sampling instant in each one of all or of selected transmission cycles, said sampling instant having a delay dictated by a sampling function relative to said transmission instant, a delay control circuit receiving said transmission clock signal and a function signal representing said sampling function and furnishing to said sampling pulse generator a sampling control signal dictating said sampling instants, and a computing circuit generating said function signal on the basis of said sampling function established in said computing circuit.

BRIEF DESCRIPTION OF THE DRAWINGS

Further features and advantages of the invention result from the following description of an example embodiment with reference to the drawings in which.

DESCRIPTION OF THE PREFERRED EMBODIMENTS

Figure 1:
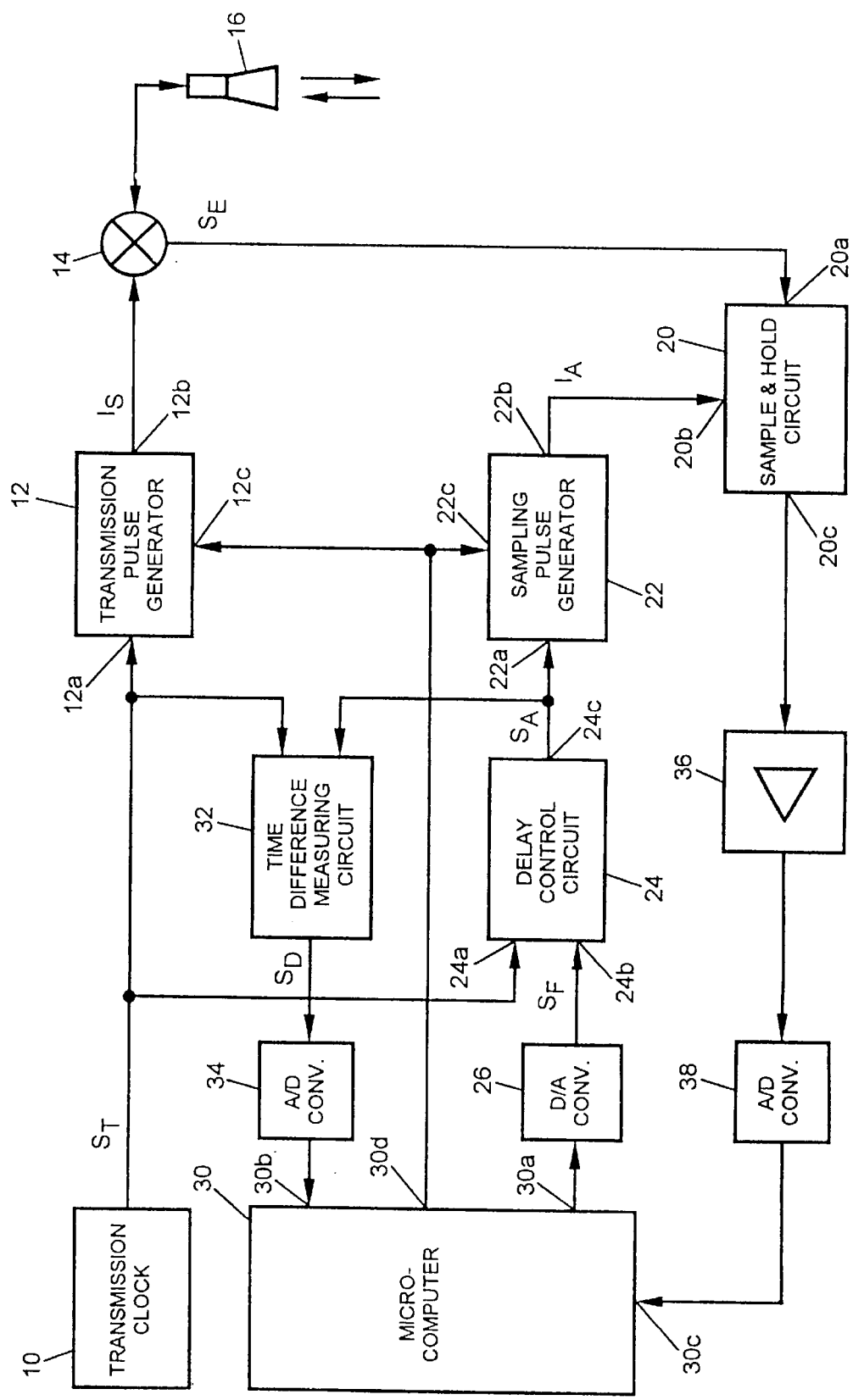
FIG. 1 is a block diagram of an arrangement for implementing the method in accordance with the invention.

FIG. 1 is a schematic block diagram of a distance measuring arrangement operating according to the pulse transit time method. This arrangement comprises a transmission clock 10, which is preferably quartz-controlled and furnishes at its output a transmission clock signal $S_T$, this signal being supplied to a control input 12a of a transmission pulse generator 12. The transmission pulse generator 12 generates a very short transmission pulse $I_S$ in each of the time intervals dictated by the transmission clock signal $S_T$, this transmission pulse being supplied from its output 12b via a duplexer 14 to an antenna. The antenna 16 simultaneously serves as the transmitting antenna and the receiving antenna. It emits in consecutive transmission cycles, the duration of which is dictated by the transmission clock signal $S_T$, the transmission pulses $I_S$ furnished by the transmission pulse generator 12 in the form of short microwave pulses, and receives in the section of each transmission cycle following each transmission pulse, microwave signals arriving at the antenna 16. Belonging particularly to these microwave signals is the wanted echo pulse reflected by the object whose distance from the measuring arrangement is to be measured. Furthermore, the received microwave signals may contain unwanted echo pulses reflected by other objects as well as other unwanted signals. The totality of these microwave signals received by the antenna 16 forms the received signal $S_E$ which is supplied via the the duplexer 14 to the receiving portion of the measuring arrangement. Distance measurement is done by establishing the transit time of the microwave pulses from the antenna 16 to the point of reflection and back to the antenna. This transit time equals the time interval between emission of the transmission pulse and reception of the wanted echo pulse. The product of the measured transit time and the known propagation speed of electromagnetic waves equals twice the distance between the measuring arrangement and the point of reflection.

One known field of application for a measuring arrangement of this kind is measuring the level in a container. This measurement can be done according to the radar principle by the antenna 16 being fitted above the highest level anticipated in the container and emitting microwave pulses downwards which pass through the vacant space to the surface level from which the echo pulses reflected at the contents material are returned through the vacant space to the antenna, as is the case in the example embodiment shown in FIG. 1. From the published European patent application EP 0 162 821 A1 it is also known to connect to the antenna a tubular wave conductor, the other end of which is immersed in the material so that microwaves are emitted from the antenna into the interior of the tubular wave conductor which are guided thereby as in a waveguide. The material surface is located in the interior of the tubular waveguide at the same level as outside and the echo waves reflected by the surface of the material return through the tubular waveguide back to the antenna.

In German patent DE 44 04 745 C2 a further level measuring device is described having no antenna for emitting and receiving microwaves, instead microwaves being directed along a wave line to the material surface. One such wave line is known by the name "Goubau line". The Goubau line may comprise two conductors in parallel in the manner of a two-wire line or a coaxial line, or it may also be formed by a single conductor only. In any case the microwaves run along the Goubau line to the material surface where they are reflected at least in part due to the existing impedance step, and the reflected portion of the microwaves runs along the Goubau line back to the feed point. Unlike the measurement according to the radar principle in which the microwave transmission pulses are emitted at a fixed carrier frequency, in application of the Goubau line each transmission pulse preferably consists of a spike pulse which occupies a broad frequency band.

Both in level measurement according to the radar principle and in the application of the Goubau line the distance between the feed point of the antenna or the Goubau line and the material surface is obtained from the transit time of the microwave pulses, i.e. from the time between emitting a transmission pulse and receiving the echo pulse reflected from the material surface; the level to be measured can easily be calculated from this distance and the known installation height of the feed point.

The measuring arrangement shown in FIG. 1 may be put to use both for distance measurement according to the radar principle and for distance measurement using the Goubau line since it is irrelevant in what way the microwave pulses are transmitted.

In the following example it is assumed that the transmission clock signal $S_T$ has a frequency of 2 MHz so that the transmission cycle dictated by the transmission clock signal has a duration of 0.5 µs. The transmission pulses $I_S$ generated by the transmission pulse generator 12 are spike pulses when a Goubau line is used, these spikes having a duration of 100 ps and occupying a frequency band of approximately 1 MHz to 4 GHz.

Where small distances are concerned, as are to be sensed, for instance, in the case of level measurements, the times to be measured are very short. For example a measuring distance of 15 m corresponds to a pulse transit time of 100 ns. Since measuring such small times with the necessary accuracy is highly complicated, in the measuring arrangement illustrated the time is extended by strobed sampling termed TDR ("Time Domain Reflectometry"). Strobed sampling is done by obtaining a sample from the received signal in selected transmission cycles, the sampling instants being increasingly shifted relative to the commencement of the transmission cycle. Sampling is done in the time portion of the transmission cycles corresponding to the distance range to be covered from the smallest distance to the largest distance anticipated. Assuming that the received signal does not substantially change during a complete sampling, the composed samples result in an image of the received signal, but on a time scale which is extended by a factor relative to the time scale of the real-time received signals. When sampling is done each time in directly consecutive transmission cycles this factor of extension in time equals the number of samplings for completely sensing a cycle of the received signal, and the sampling time interval, i.e. the spacing in time between two consecutive samplings is—except for a slight change in the time shift relative to the transmission instant—equal to the duration of the transmission cycle. An even greater time extension is achieved when a sample is obtained not in every transmission cycle but only in each nth transmission cycle; in this case the sampling time interval equals the duration of n consecutive transmission cycles, and the time extension factor equals the product of the number of samplings for completely sensing a cycle of the received signal and the number n of transmission cycles in each sampling time interval.

In the measuring arrangement illustrated, strobed sampling is done by a sample-and-hold circuit 20 which receives the received signal $S_E$ at a signal input 20a. A control input 20b of the sample-and-hold circuit 20 is connected to the output of a sampling pulse generator 22. For each sampling pulse $I_A$ sent from the sampling pulse generator 22 to the control input 20b the sample-and-hold circuit 20 samples the instantaneous value of the received signal $S_E$; the obtained sample is held and is available at the output 20c of the sample-and-hold circuit 20 until the next sampling.

Figure 2:
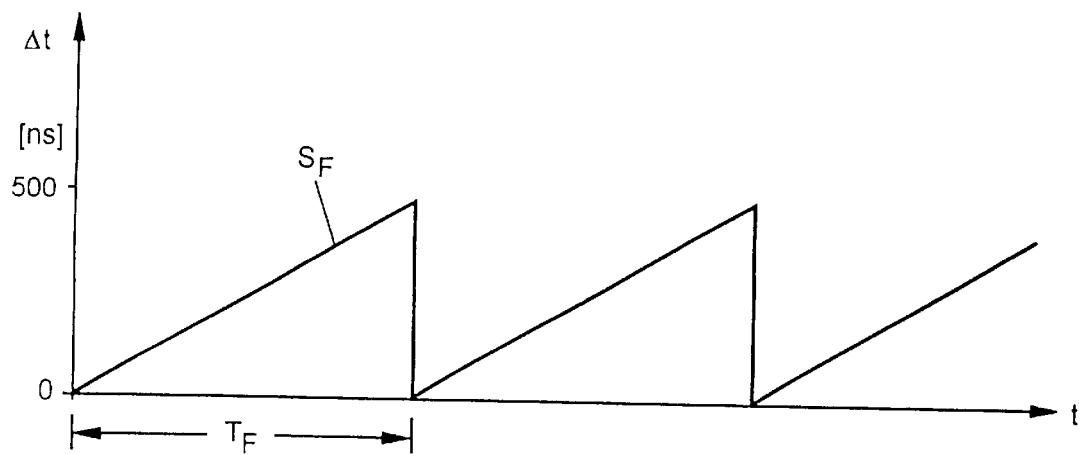
FIG. 2 is a time plot of a sampling function, applicable to the method in accordance with the invention.

So that the samplings are carried out in the aforementioned way with an increasing time delay $\Delta t$ relative to the commencement of the transmission cycles, the generation of the sampling pulses by the sampling pulse generator 22 is controlled by a delay control circuit 24. This delay control circuit 24 receives at an input 24a the transmission clock signal $S_T$ and at an input 24b a function signal $S_F$ which determines the desired time profile of the delay $\Delta t$ to be exhibited by each of the consecutive sampling pulses $I_A$ relative to the commencement of the transmission cycle in which sampling occurs. In the simplest case when the delay $\Delta t$ is required to linearly increase from one sampling pulse to the next, the function signal $S_F$ may be a cyclic sawtooth signal as is illustrated in FIG. 2. The instantaneous value of the sawtooth signal $S_F$ indicates the delay $\Delta t$ for the corresponding sampling instant in the range of e.g. 0 to 500 ns to be covered, and the period $T_F$ corresponds to the total duration of the transmission cycles over which complete sensing of a cycle of the received signal $S_E$ is required to extend. When for instance sampling is to be done only every 2 ms, i.e. in the given example in each 4000th transmission cycle, and completely sensing a cycle of the received signal $S_E$ is to be done by 1000 samplings, then the function signal $S_F$ has a period $T_F$ of 2 s.

The delay control circuit 24 furnishes at its output 24c a sampling control signal $S_A$ which has the same frequency as that of the transmission clock signal $S_T$ applied to the input 24a but which is delayed relative to this transmission clock signal $S_T$ by a delay $\Delta t$ having the value as dictated by the instantaneous value of the function signal $S_F$. This sampling control signal $S_A$ is applied to a control input 22a of the sampling pulse generator 22. Accordingly, the sampling pulse generator 22 generates in each cycle of the transmission clock signal $S_T$ at its output a sampling pulse $I_A$ which trails the transmission pulse $I_S$ generated in the same transmission cycle by the transmission pulse generator 12 by this delay $\Delta t$. For each subsequent sampling pulse $I_A$ the delay $\Delta t$ increases corresponding to the rise in the function signal $S_F$, until the end of the period $T_F$ is reached. The delay $\Delta t$ then jumps back to the starting value and the increase commences anew. The samples obtained in each cycle of the sawtooth signal result in an image of a cycle of the sampled portion of the received signal $S_E$ extended in time.

One special feature of the measuring arrangement as shown in FIG. 1 consists of the function signal being generated by a computing circuit which in the example embodiment illustrated is formed by a microcomputer 30 in which the sampling function dictating the time profile of the function signal is stored. The microcomputer 30 furnishes a digital signal at an output 30a, which signal represents the time profile of the function signal and is converted by a digital-to-analog converter 26 into the analog function signal $S_F$ which is supplied to the delay control circuit 24. The sampling function may be generated by an algorithm stored in the microcomputer 30 which for instance in the case of the linear ramp function illustrated in FIG. 2 is easily possible, or it can be mapped in the microcomputer 30 for a more complicated profile.

One salient advantage of generating the function signal $S_F$ by the microcomputer 30 is that it is easy to monitor whether the delay $\Delta t$ provided to the sampling control signal $S_A$ relative to the transmission clock signal $S_T$ precisely corresponds to the sampling instant to be sensed and that any deviation found can be eliminated. For this purpose a time difference measuring circuit 32 is provided which receives at one input the transmission clock signal $S_T$ and at its second input the sampling control signal $S_A$ and delivers at its output a time difference signal $S_D$ indicating the difference in time $\Delta t$ between the signals $S_A$ and $S_T$. This analog time difference signal $S_D$ is converted in an analog-to-digital converter 34 into a digital signal which is supplied to an input 30b of the microcomputer 30. The microcomputer 30 compares the measured time difference $\Delta t$ to the design value established for the momentary sampling instant and produces a correction for the function value furnished at output 30a in case there is a deviation, by means of which the deviation can be eliminated. The correction values established for the various sampling instants can be memorized in the microcomputer 30 and made use of in subsequent samplings.

This correction can be done in various ways. Since the causes of the error, such as changes in temperature, voltage fluctuations, aging of components etc. as a rule alter only slowly, making a correction in largish time spacings, e.g. every 5 minutes, is usually sufficient. For a linear function, as in the case of the ramp function illustrated in FIG. 2, it is sufficient to detect and correct the error at two points for correcting the whole function.

Figure 3:
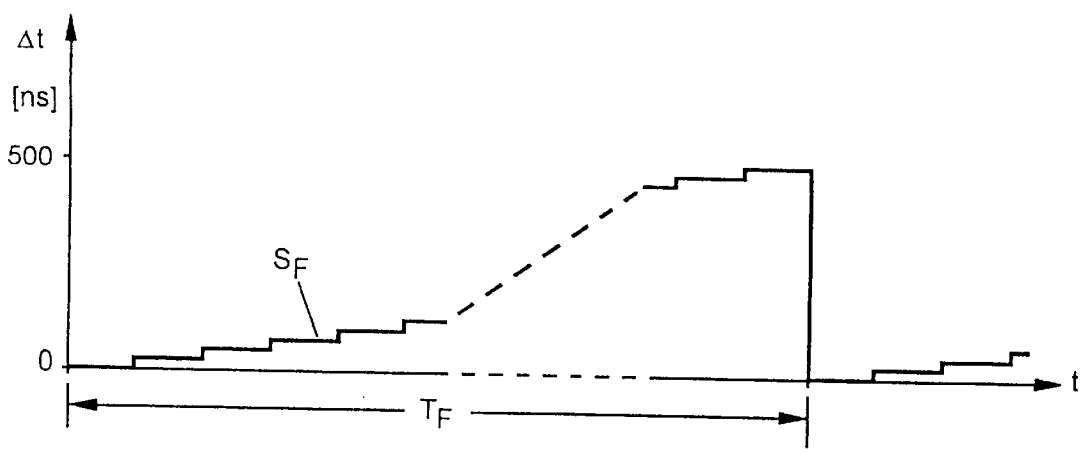
FIG. 3 is a time plot of another sampling function, applicable to the method in accordance with the invention.

A further advantage of generating the function signal $S_F$ by the microcomputer 30 is that instead of a linear ramp function, as is illustrated in FIG. 2, any other function for sampling the received signal $S_E$ may be applied. As an example, a staircase function is illustrated in FIG. 3, in which the steps have a length of several sampling time intervals. To make it more clear, FIG. 3 only shows the starting and finishing portion of a cycle of the staircase function on a time scale which is substantially greater than that of the sawtooth function in FIG. 2. By making use of this staircase function the received signal $S_E$ is sampled in several selected transmission cycles in sequence with the same delay $\Delta t$, i.e. multiply at a sampling instant corresponding to the same measuring distance, before the system advances to the next value of the delay $\Delta t$. The samples obtained for the same delay $\Delta t$ may be integrated prior to evaluation, as a result of which the accuracy of the measurement is enhanced and the influence of disturbing factors reduced. Furthermore, by making use of differing step durations and/or step levels, sampling the received signals can be adapted to differing conditions and optimized. The number of samplings may be increased by longer steps in certain distance ranges and reduced by shorter steps in other distance ranges. Lower steps result in the sampled distance points being located nearer to each other and thus the resolution in this range increased, whilst due to higher steps the resolution in other ranges can be reduced. As a result of this the user is afforded high flexibility in adapting sampling to differing requirements.

Preferably, for generating the function signal the same microcomputer is used as is employed for evaluating the received signal extended in time as obtained by strobed sampling. In the measuring arrangement as illustrated in FIG. 1 the output signal of the sample-and-hold circuit 20, after being amplified in an amplifier 36, is thus converted by an analog-to-digital converter 38 into a digital signal which is applied to an input 30c of the microcomputer 30. The microcomputer 30 establishes from the digitized samples the location of the wanted echo pulse in the received signal and determines its transit time, from which it obtains the distance to be measured. In this arrangement use is made preferably of the time difference signal $S_D$ furnished by the time difference measuring circuit 32 as the reference signal, this time difference signal $S_D$ being a precise indication of the time spacing from the transmission instant for each sampling instant so that the microcomputer 30 is able to establish from the time difference signal $S_D$ the precise time spacing between the sampling instant in which the wanted echo pulse has been sensed and the transmission instant and thus the delay of the microwave pulse.

Furthermore, the microcomputer 30 is able to modify sampling as a function of the result of evaluation. For instance, it may increase the number of samplings in the vicinity of the wanted echo pulse and reduce it in regions remote therefrom, or it may restrict sampling to an evaluation time window in which the wanted echo pulse is located, and to cause this evaluation window to track the location of the wanted echo pulse when there is a change in the distance to be measured. On application of the staircase function illustrated in FIG. 3 the microcomputer is able to increase the number of consecutive samplings of the same measurement point in the region of the wanted echo pulse by varying the step lengths and to reduce it in other regions.

When in the described example embodiment a sample is formed in each transmission cycle, the samples follow in sequence with the frequency of the transmission clock signal $S_T$ of 2 MHz, i.e. in intervals of 0.5 $\mu$s. However, the microcomputers usually employed are able to accommodate the samples only with a substantially lower repetition frequency, for example 500 Hz, i.e. in time intervals of 2 ms. This is the main reason why sampling is not undertaken in every transmission cycle, but in every nth transmission cycle, for example in every 4000th transmission cycle. Since, however, the transmission clock 10 continues to furnish the transmission signal $S_T$ with a frequency of 2 MHz and accordingly also the delay control circuit 24 outputs the sampling control signal $S_A$ at the same frequency, the time difference measuring circuit 32 is able to measure the time difference $\Delta t$ between these signals with the same frequency, i.e. for example to undertake 4000 time difference measurements in the sampling time interval between two samplings. When use is made of the staircase curve as shown in FIG. 3 the time difference $\Delta t$ does not change in this time interval, so that the same instantaneous value is obtained 4000 times. This is why preferably the measured values for the time difference $\Delta t$ obtained in the sampling time interval are integrated in the time difference measuring circuit 32 and the integration value output as the time difference signal $S_D$. As a result of this the measuring aaccuracy is increased for the time difference measurement, the influence of disturbing factors reduced and the signal amplitude made larger.

However, the same integration may also be put to use in application of the sawtooth signal as shown in FIG. 2. Although the time difference $\Delta t$ changes continuously in the sampling time interval in this case, this change is, on the one hand, very slight, it amounting to but a single sampling step, and, on the other, the change is linear so that due to integration an average value is obtained which lies precisely in the middle between the time difference $\Delta t$ of the previous sampling instant and the time difference $\Delta t$ of the following sampling instant. This average value can thus be used in the microcomputer 30 in the same way as the precise time difference $\Delta t$ of a sampling instant for correcting the time difference and as a reference in establishing the pulse transit time. This applies correspondingly to any other sampling function; since this sampling function is known in the microcomputer, the microcomputer is able to compute the relationship between the integration value and the time difference to be measured and take it into account when correcting the time difference as well as in establishing the pulse transit time.

Should sampling not be undertaken in every transmission cycle, but in every nth transmission cycle, a further measure is provided for as shown in FIG. 1 which is possible due to the sampling function being generated by the microcomputer 30 and has the purpose of saving energy. When in the case of the aforementioned example a transmission pulse is generated in each transmission cycle, only every 4000th transmission pulse is made use of for evaluation whilst the remaining transmission pulses remain unused. The majority of the power consumed by the measuring arrangement is made use of, however, for generating the transmission pulses. This is why in the measuring arrangement as shown in FIG. 1 the microcomputer 30 furnishes at its output 30d a blocking signal which is supplied to a control input 12c of the transmission pulse generator 12 and to a control input 22c of the sampling pulse generator 22 and is designed to prevent generation of transmission pulses $I_S$ and sampling pulses $I_A$ in all transmission cycles in which no useful sampling occurs. In this way a considerable saving in energy is achieved without detrimenting the function of the measuring arrangement. This energy saving feature is more particularly important in the case of measuring arrangements having a two-wire supply in which the power supply of the measuring arrangement is made from a central station by a two-wire line via which in the opposite direction the measurement signal is transferred in the form of a current varying between 4 and 20 mA. In such measuring arrangements the current available for powering the measuring arrangement is restricted to 4 mA so that every possibility of saving energy needs to be exploited.

The person skilled in the art will readily appreciate various modifications of the measuring arrangement as shown in FIG. 1. More particularly, instead of the microcomputer 30 any other computing circuit may be put to use which is capable of generating the function signal $S_F$ on the basis of a sampling function which determines the time profile of the function signal. This may, for instance, also be an analog computing circuit.

What is claimed is:

1. A method for electromagnetic wave distance measurement by a pulse transit time method, wherein short electromagnetic transmission pulses are emitted at periodic transmission instants and signals received in selected transmission cycles after the respective periodic transmission instants are sampled for obtaining, in each of the selected transmission cycles, a sample at a sampling instant in a respective sampling time interval, each of the sampling instants having a delay dictated by a sampling function relative to the respective periodic transmission instant so that the sampling instants exhibit differing delays relative to the respective periodic transmission instants, and wherein an evaluation of the samples for determining the distance to be measured is done in a computing circuit and the computing circuit generates the sampling function dictating the delays of the sampling instants.

2. The method as set forth in claim 1, wherein the computing circuit evaluating the samples and generating the sampling function is a microcomputer.

3. The method as set forth in claim 2, wherein said sampling function is generated by an algorithm stored in said microcomputer.

4. The method as set forth in claim 2, wherein said sampling function is mapped in said microcomputer.

5. The method as set forth in claim 1, wherein said sampling function is a linear ramp function.

6. The method as set forth in claim 1, wherein said sampling function is a staircase function, the steps of which have a length of several sampling time intervals so that the sampling instants in several consecutive sampling time intervals have the same delay relative to the respective periodic transmission instants.

7. The method as set forth in claim 6, wherein the samples obtained during a step of said staircase function are integrated.

8. The method as set forth in claim 1, wherein a measurement value of the delay exhibited by the sampling instant relative to the respective periodic transmission instant in the same transmission cycle is measured, the measurement value is compared to a design value in the computing circuit and should a deviation exist, the sampling function is corrected to eliminate the deviation.

9. The method as set forth in claim 8, wherein correction values established for correcting the sampling function are memorized in the computing circuit and made use of in subsequent samplings.

10. The method as set forth in claim 8, wherein the measurement value of the delay is used in the computing circuit as a reference value for determining the distance to be measured.

11. The method as set forth in claim 10, wherein the computing circuit modifies the sampling function in dependence on the evaluation of the samples.

12. The method as set forth in claim 8, wherein each respective sampling time interval has a duration of several transmission cycles so that sampling occurs in each case only in one of several consecutive transmission cycles, and wherein measurement of the delay is also done in transmission cycles in which no sampling occurs, and the measurement values of the delay obtained between two consecutive samplings are integrated.

13. The method as set forth in claim 12, wherein said computing circuit permits emission of transmission pulses and sampling of received signals only in transmission cycles in which sampling occurs.

14. An arrangement for electromagnetic wave distance measurement by a pulse transit time method comprising a transceiver assembly for emitting short electromagnetic transmission pulses at periodic transmission instants and for furnishing received signals containing reflected echo pulses, a transmission pulse generator for generating said short electromagnetic transmission pulses, a transmission clock generating a periodic transmission clock signal supplied to said transmission pulse generator and dictating said periodic transmission instants, a sampling circuit in which samples are taken from said received signals in consecutive transmission cycles with control by sampling pulses, a sampling pulse generator generating one sampling pulse at a sampling instant in each one of all or of selected transmission cycles, said sampling instant having a delay dictated by a sampling function relative to one of said transmission instants, a delay control circuit receiving said periodic transmission clock signal and a function signal representing said sampling function and furnishing to said sampling pulse generator a sampling control signal dictating said sampling instants, and a computing circuit evaluating said samples for determining the distance to be measured and generating said function signal on the basis of said sampling function generated in said computing circuit.

15. The arrangement as set forth in claim 14, wherein said computing circuit is a microcomputer.

16. The arrangement as set forth in claim 14, including a time difference measuring circuit which at a first input receives the periodic transmission clock signal and at a second input receives the sampling control signal and which furnishes at its output a time difference signal representing a time difference between these two signals, said time difference signal being supplied to said computing circuit.

17. The arrangement as set forth in claim 16, wherein in said computing circuit the time difference represented by said time difference signal is compared to a design value and in case of a deviation said function signal is modified to remove said deviation.

18. The arrangement as set forth in claim 16, wherein in said computing circuit the time difference represented by said time difference signal is used as a reference value for determining the distance to be measured.

* * * * *

UNITED STATES PATENT AND TRADEMARK OFFICE
CERTIFICATE OF CORRECTION

PATENT NO. : 6,122,602
DATED : September 19, 2000
INVENTOR(S) : Bernhard Michalski and Kenneth L. Perdue It is certified that error appears in the above-identified patent and that said Letters Patent is hereby corrected as shown below:

Title page,
Insert the following references cited in item [56]:

U.S. PATENT DOCUMENTS 4,008,469    2/15/1977    Chapman

FOREIGN PATENT DOCUMENTS

| 2 238 201 | 5/22/1991 | United Kingdom |
| WO 96/07928 | 3/14/1996 | Patent Cooperation Treaty |

Signed and Sealed this

Ninth Day of October, 2001

Attest:

NICHOLAS P. GODICI
Attesting Officer   Acting Director of the United States Patent and Trademark Office